United States Patent [19]

Krenz

[11] Patent Number: 4,903,221

[45] Date of Patent: Feb. 20, 1990

[54] KEYBOARD LATCHING ARRANGEMENT FOR PORTABLE COMPUTERS

[75] Inventor: Horst M. Krenz, Bridgman, Mich.

[73] Assignee: Zenith Electronics Corporation, Glenview, Ill.

[21] Appl. No.: 265,078

[22] Filed: Oct. 31, 1988

[51] Int. Cl.$^4$ .............................................. G06F 1/00
[52] U.S. Cl. .................................................. 364/708
[58] Field of Search ............... 364/708; 361/393–394; 340/700, 711; 400/682, 691

[56] References Cited

U.S. PATENT DOCUMENTS

| 4,667,299 | 5/1987 | Dunn | 364/708 |
| 4,704,604 | 11/1987 | Fuhs | 364/708 X |
| 4,736,332 | 4/1988 | Crease | 364/708 |
| 4,769,764 | 9/1988 | Levanon | 364/708 |

FOREIGN PATENT DOCUMENTS 60-160418  8/1985  Japan ................................. 364/708

OTHER PUBLICATIONS

IBM Tech. Disclosure Bulletin, vol. 28, No. 6, Nov. 1985, pp. 2361-2363, "Keyboard Support Lifting Assembly with Locking Feature".

*Primary Examiner*—Gary V. Harkcom
*Assistant Examiner*—Tan V. Mai

[57] ABSTRACT

A portable computer with a base, a pivotal visual display and a keyboard releasably attached to the base so it can be used as a stand alone component. The base has a tapered forwardly projecting wide tongue that guides the keyboard horizontally and vertically as the keyboard moves toward the base and when the keyboard reaches its fully seated position a pair of latch assemblies automatically engage. The rear of the keyboard has a transverse recess into which a precoiled section of keyboard cable is stored in the keyboard attached position.

20 Claims, 5 Drawing Sheets

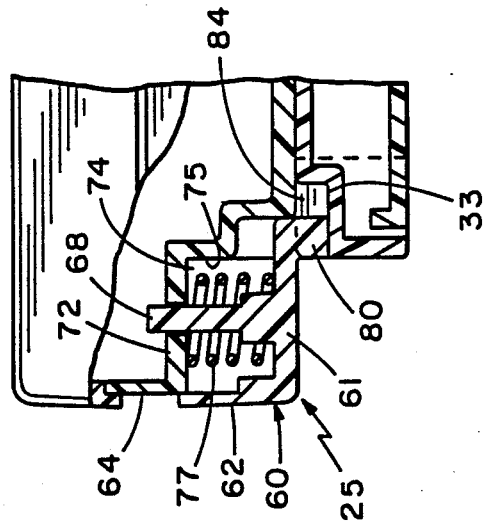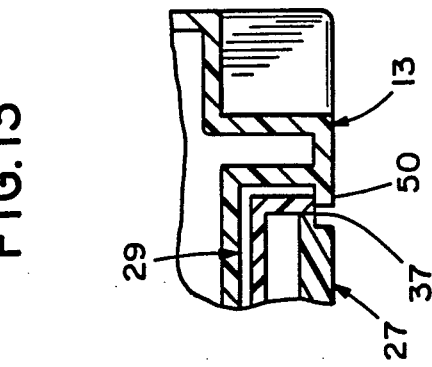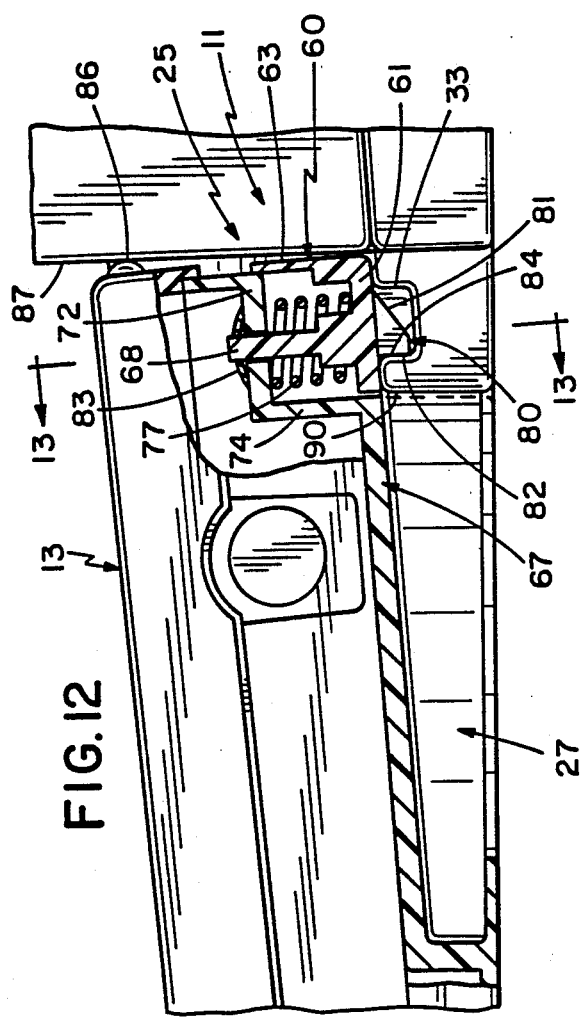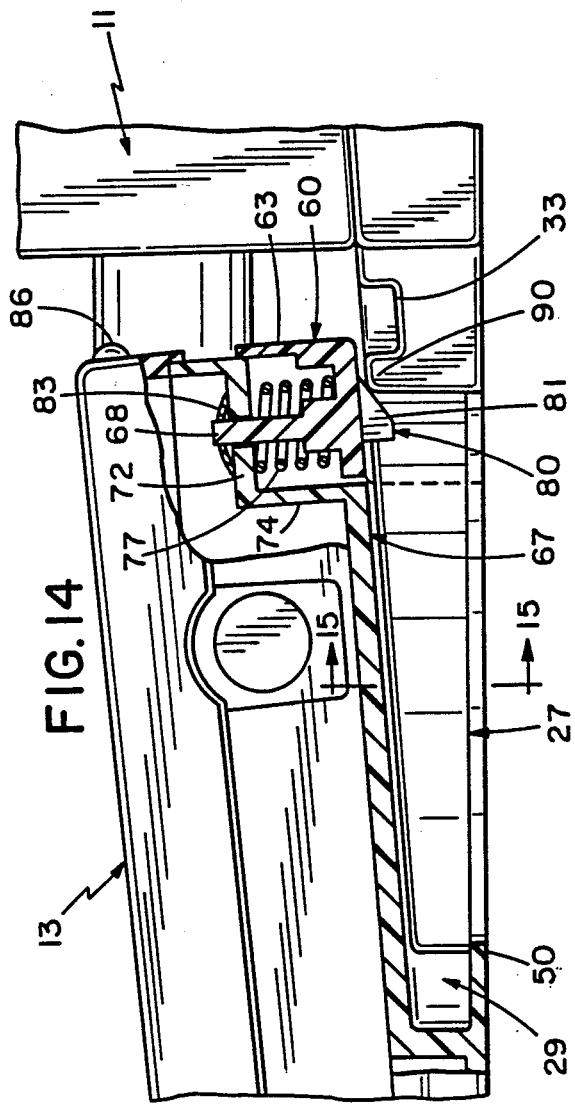

KEYBOARD LATCHING ARRANGEMENT FOR PORTABLE COMPUTERS

BACKGROUND OF THE INVENTION AND PRIOR ART

Over recent years there has been a widespread development of personal computers, and the industry has experienced a rather dramatic increase in the design, development and sale of computer which are portable. These portable computers are not significantly larger than small portable typewriters, and contain their own built-in central processing unit, memory, hard drive, disk drives, keyboard, visual display and carrying handle. The display is typically a liquid crystal display on one side of a panel or lid which folds down flat on the upper surface of the keyboard to serve as a cover to protect the keyboard and display during storage and travel.

It is desirable that the display panel, including its hinging hardware, fold flush with the upper surface of the keyboard and this is sometimes accomplished by accommodating the display panel with a recess into which the upper surface of the keyboard fits.

In the past, the keyboards have been permanently fixed to a base so that in use the user had to operate the keyboard in a position directly adjacent the open lid and base. This has several disadvantages, the first of which is that it requires the user's eyes by within 12 to 14 inches of the screen, which is not the optimum distance for eye comfort. Secondly, the standard table height of 30 to 31 inches positions the keyboard, when fixed to the computer, at a height somewhat higher than desirable for operator hand comfort.

This problem is obviated in separate component personal computer systems by providing computer tables that have separate lower keyboard shelves, but of course the components are not portable as a unit.

There have, in the past, been provided keyboard assemblies which are selectively attachable to video display units to provide keyboard stability, such as shown in the Fuhs, U.S. Pat. No. 4,704,604, but this detachable keyboard is not designed for a portable computer where the keyboard must be rigidly fixed to the base for transport.

It is a primary object of the present invention to ameliorate the problems noted above in keyboards for portable computers.

SUMMARY OF THE PRESENT INVENTION

In accordance with the present invention a portable computer is provided with a keyboard release mechanism so the keyboard can be used in a stand alone mode, if desired, where the keyboard is easily released from the computer base by finger depression of a pair of simple latch-detent assemblies, and guided back to an attached position on the base by a wide planar tapered tongue with converging sides. As the tapered tongue guides the keyboard to its final position, both horizontally and vertically, the latch-detent assemblies automatically engage and lock the keyboard to the base.

The keyboard release mechanism enables the keyboard to be spaced from the base and the video display either horizontally or vertically. Spacing the keyboard from the base and video display horizontally positions the user's eyes a more comfortable distance from the visual display screen. This feature also enables the present portable computer to be utilized in the keyboard detached mode on a conventional computer table with the keyboard on the lower adjustable keyboard itself. No present portable computer has this capability.

Toward these ends, the present portable computer is provided with a laterally elongated base housing a disk drive and central processing unit, a lid assembly pivotally mounted to the base which pivots down and locks to a keyboard assembly detachably fixed to the forward face of the base. The base has a forwardly extending lower tongue that has vertically converging top and bottom walls and forwardly converging side walls that are designed to enter a complementary recess in the lower rear of the keyboard assembly. These converging top, bottom and side walls on the tongue serve firstly to guide the keyboard toward its final position as the keyboard is reattached to the base, and also to vertically, angularly and laterally lock the keyboard to the base. The keyboard is prevented from movement away from the tongue by a pair of spring biased finger operated latch-detent mechanisms that are cammed into locking recesses in the tongue automatically as the user pushes the keyboard toward the base.

Another important and independent feature of the present invention is the provision of a flexible cable interconnecting the keyboard and the base that has a precoiled section that enters a rear recess in the keyboard as the keyboard is reattached to the base without requiring the user to manipulate the cord into the recess.

Still a further feature of the present invention is the provision of retractable spaced legs on the bottom of the keyboard assembly that enable the keyboard to be utilized in a tilted position. If additional keyboard tilt is required in conventional portable computers, it is necessary to tilt the entire computer. With the present detachable keyboard, the retractable legs are quite simple because they do not have the support the entire weight of the computer but only the keyboard assembly.

Other objects and advantages of the present invention will appear more clearly from the following detailed description.

BRIEF DESCRIPTION OF THE DRAWINGS

FIG. 12 is a partly fragmented right-side view of the keyboard assembly and base with the keyboard assembly attached showing the right keyboard assembly latch-detent mechanism;

FIG. 13 is a fragmentary section taken generally along line 13—13 of FIG. 12;

FIG. 14 is a partly fragmented right-side view of the keyboard assembly just prior to final positioning on the base, and;

FIG. 15 is a fragmentary section taken generally along line 15—15 of FIG. 14.

DETAILED DESCRIPTION OF THE PREFERRED EMBODIMENT

Figure 1:
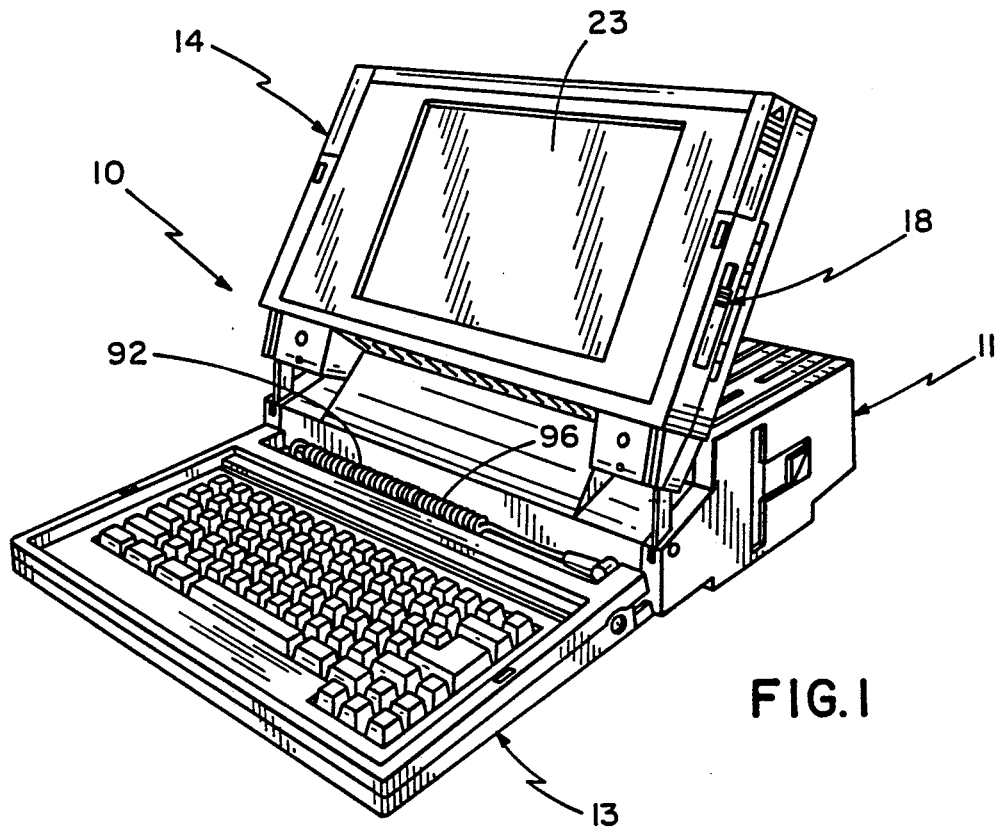
FIG. 1 is a perspective view of the personal computer according to the present invention with the lid assembly open and the keyboard assembly attached.
Figure 2:
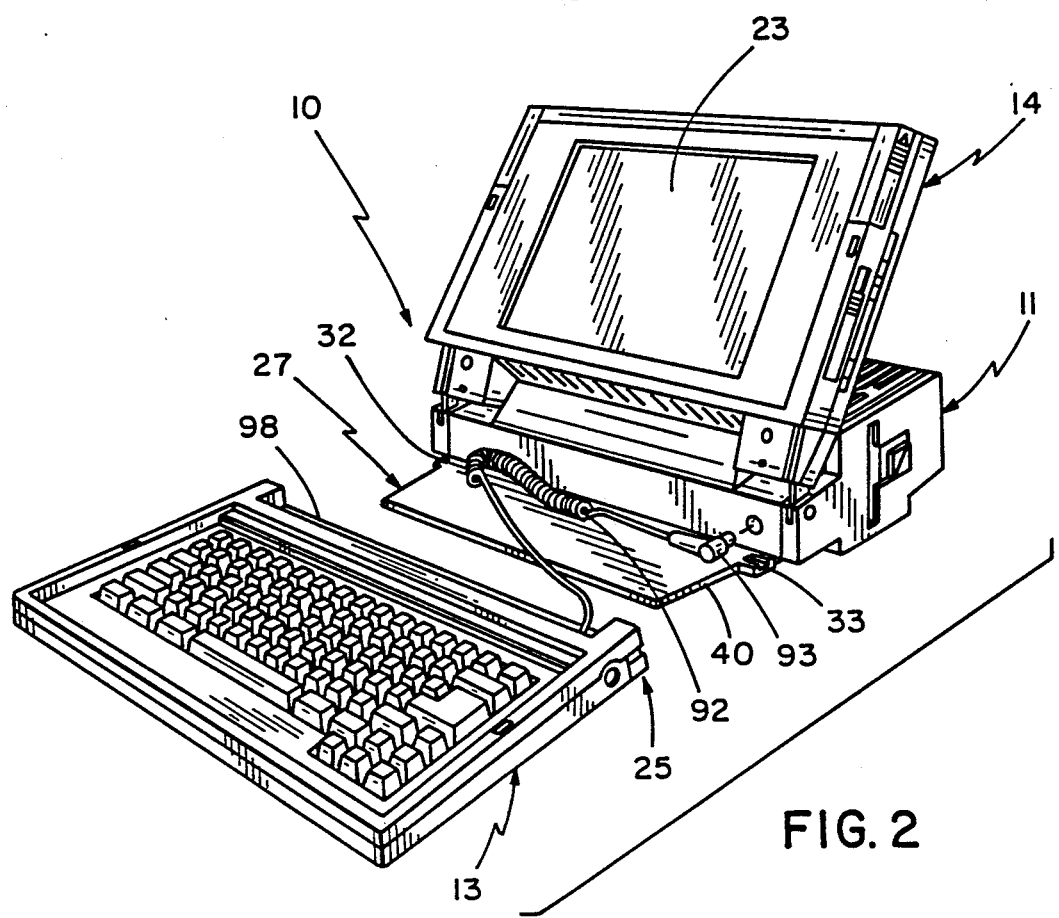
FIG. 2 is a perspective view similar to FIG. 1 with the keyboard assembly detached.
Figure 3:
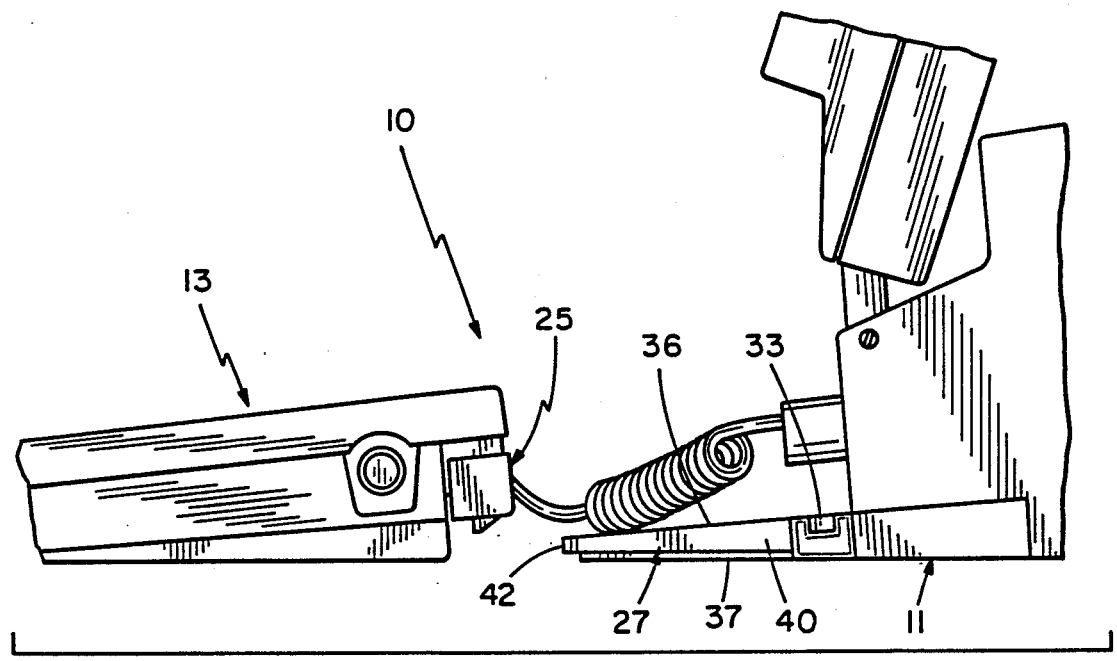
FIG. 3 is a right side view of the computer illustrated in FIGS. 1 and 2 with the keyboard assembly detached.

Referring to the drawings and particularly FIGS. 1 to 3, a portable computer 10 is illustrated according to the present invention and seen to generally include a transversely elongated base 11, a detachable keyboard assembly 13, and a lid assembly 14 pivotally mounted on base 11. The lid assembly 14 is selectively locked over the keyboard assembly 13 by side latch assemblies 18.

The base 11 typically carries a central processing unit, memory circuitry, hard drive, disk drives and a plurality of slots for additional optional components.

The keyboard assembly 13 includes a plurality of keys for manually accessing the central processing unit in the base 11. The lid assembly 14 has a flat LCD screen assembly 23 mounted therein visible as seen in FIGS. 1 and 2 when the lid is in its open position.

Figure 4:
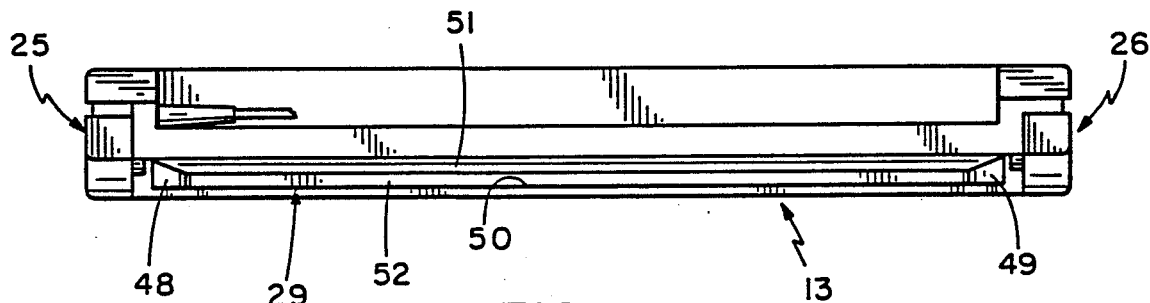
FIG. 4 is a rear view of the keyboard assembly illustrated in FIGS. 1 to 3.
Figure 5:
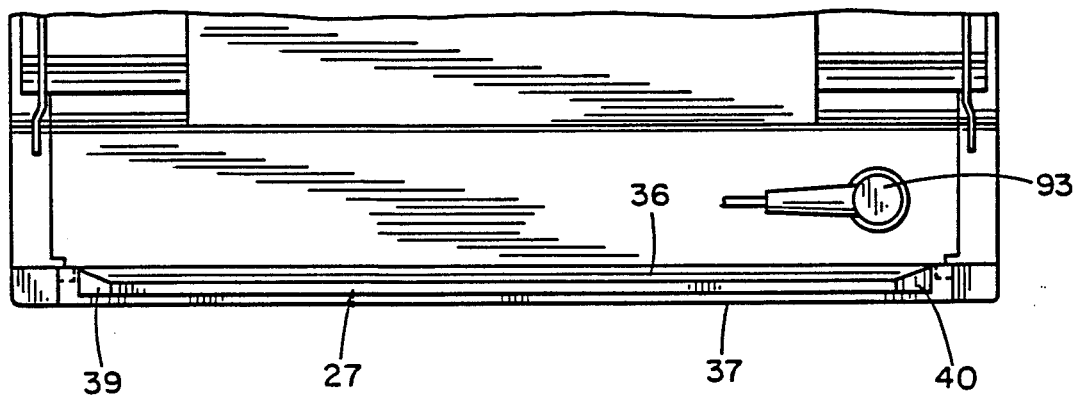
FIG. 5 is a fragmentary front view of the lower portion of the base illustrated in FIGS. 1 to 3.

The keyboard assembly 13 is releasably locked to the base 11 by a pair of finger operated latch-detent assemblies 25 and 26, an integral tongue 27 projecting forwardly from base 11, a forwardly extending recess 29 in the rear of the keyboard assembly 13 (see FIG. 4), and a pair of recesses 32 and 33 (see FIGS. 2 and 6) that cooperate with the latch-detent assemblies 26 and 25 respectively.

Figure 6:
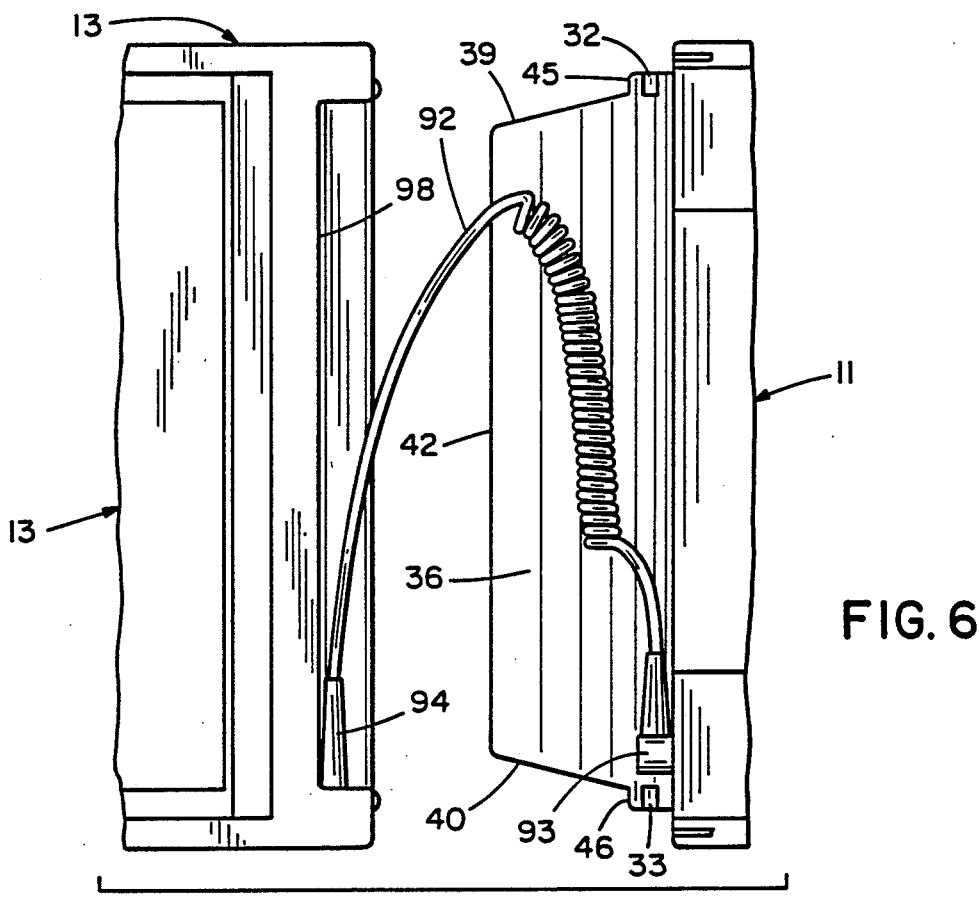
FIG. 6 is a fragmentary top view of the computer with the keyboard assembly detached.
Figure 7:
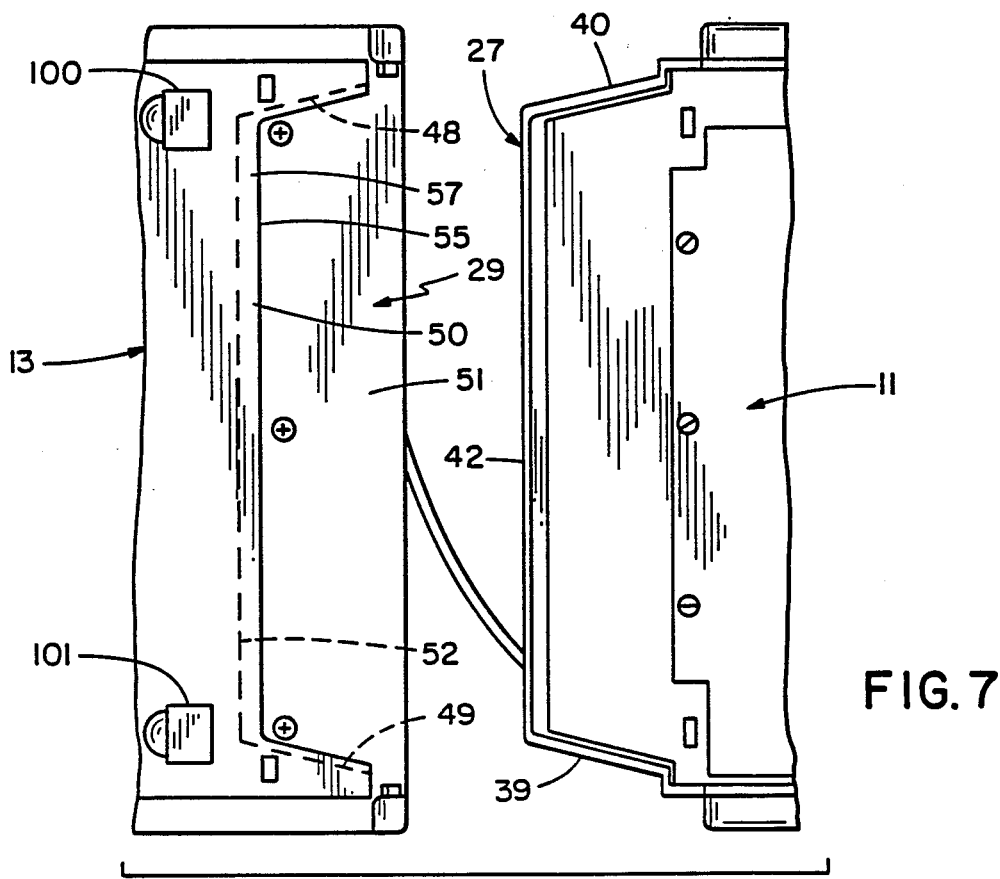
FIG. 7 is a fragmentary bottom view of the keyboard assembly and base illustrated in FIG. 6.
Figure 8:
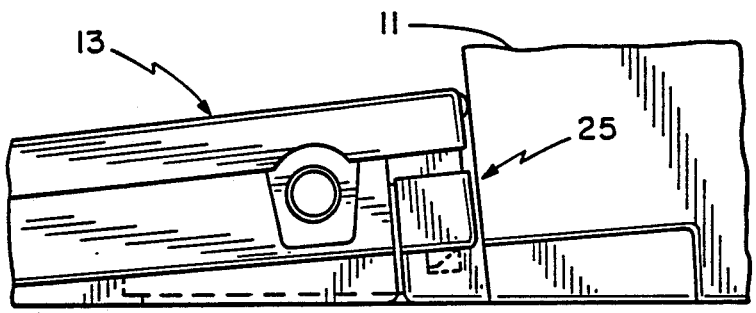
FIG. 8 is a fragmentary right-side view of the computer and base with the keyboard assembly attached.

As seen in FIGS. 3, 6 and 7, the tongue 27 has a width substantially equal to the width of the base 11 and a length about equal to one-third the forward to rear dimension of the keyboard assembly 13, and includes a downwardly angled top wall 36 converging toward horizontal bottom wall 37, forwardly converging side walls 39 and 40 and a flat short forward wall 42. The recesses 32 and 33 are formed in projections 45 and 46 having upper surfaces coplanar with tongue top wall 36, as seen in FIG. 3 for example.

The tongue 27 fits in complementary recess 29 (FIG. 4) in the rear of the keyboard assembly 13, and recess 29 includes forwardly converging side walls 48 and 49, flat, horizontal bottom wall 50, downwardly converging top wall 51 and forward wall 52. As seen in FIG. 7, the bottom wall 50 has a cut-out 55 leaving a portion 57 that overhangs the side walls 48 and 49 and the forward wall 52.

Tongue 27 is of sufficient size so that when fully seated in the recess 29, as seen in FIGS. 8, 9, 11 and 12, all of the walls of the tongue 27 are directly adjacent all of the walls of the recess 29.

The latch-detent assemblies 25 and 26 are mirror images of one another so the following description of right latch-detent assembly 25 applies equally to latch-detent assembly 26.

Detent assembly 25 includes a generally cubical slide 60 having a bottom wall 61, vertical side wall 62, and rear wall 63 slidably engaging side wall 64 and rear wall 65 of keyboard base 67.

The bottom wall 61 has a stepped upwardly extending post 68, a reduced portion of which extends through a hole 69 in keyboard panel wall 72 that forms part of a cubical recess in the rear bottom corner of keyboard base 67, also defined by walls 74 and 75. A coil compression spring 77 surround post 68 and biases the slide 60 downwardly. Retainer clip 83 holds the slide 60 with spring 77 extended in the FIGS. 12 and 13 position so that when the keyboard assembly 13 is separated from the base 11, the slide 60 stays in that position and does not hang down from the keyboard assembly 13.

Bottom wall 61 of the slide 60 has an offset downwardly extending detent 80 having an inclined ramp 81 and a vertical locking wall 82 that as seen in the engaged position illustrated in FIG. 12 contacts rear wall 84 of the recess 33 to lock the keyboard assembly 13 in position with projections 86 on the upper rear of the keyboard assembly 13 engaging forward wall 87 on base 11, as seen in FIG. 12.

Keyboard assembly 13 is detached from the base 11 by hand-grasping its opposite sides and depressing the slides 60 upwardly with the index fingers, disengaging the detents 80 from recesses 32 and 33, permitting the keyboard assembly 13 to be easily withdrawn from tongue 27.

The keyboard assembly 13 is reattached to the base 11 by sliding it over the tongue 27, contacting and guiding the top, bottom and side walls of keyboard recess 29, which automatically shifts the keyboard assembly 13 into alignment with tongue 27 laterally, vertically and angularly.

When the detent ramps 81 hit the forward side of recess projections 90, as seen in FIGS. 14 and 15, the bottom wall 37 of tongue 27 is just overlapped by keyboard recess bottom wall 50. This geometry prevents the keyboard assembly 13 from moving upwardly in this position and assuring that detents 80 will be properly cammed by abutments 90. The user then pushes the forward end of the keyboard assembly 13 rearwardly causing the detent ramps 81 to cam the detents and slides up and over the abutments 90, after which the detents snap into the recesses 32 and 33 locking the keyboard assembly to the base 11. In this locked position, tongue 27 prevents angular movement of the keyboard assembly 13 with respect to the base 11 in all directions, and the detents 80 prevent withdrawal of the keyboard assembly 13 from the tongue 27.

As seen in FIGS. 1, 2, 3 and 10, a flexible conductor cable or cord 92 is provided between the keyboard assembly 13 and the base 11 having connectors 93 and 94, connectable respectively to base 11 and keyboard assembly 13 with an intermediate pre-coiled section 96 that conveniently fits in an elongated rear recess 98 in the keyboard assembly 13. Connectors 93 and 94 fit in sockets in the base 11 and the keyboard assembly 13 on the same end of recess 98, and with this geometry the cable or cords 92 collapses itself into recess 98 as the keyboard assembly 13 is reattached to the base 11. Note the final position of cable 92 in recess 98 illustrated in FIG. 10.

Figure 9:
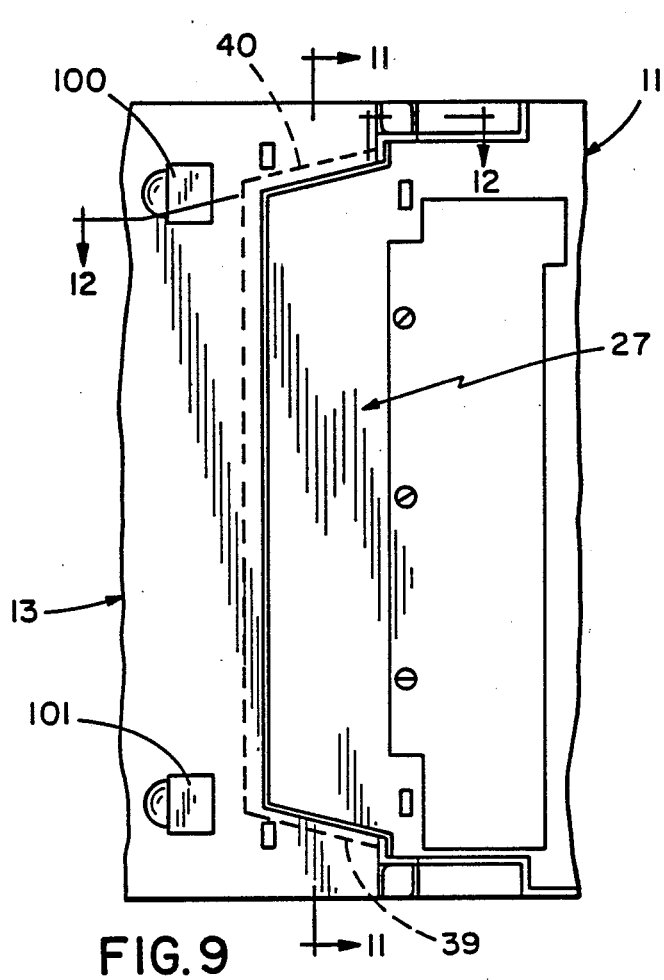
FIG. 9 is a fragmentary bottom view of the keyboard assembly and base with the keyboard assembly attached also showing the keyboard assembly's legs retracted.
Figure 10:
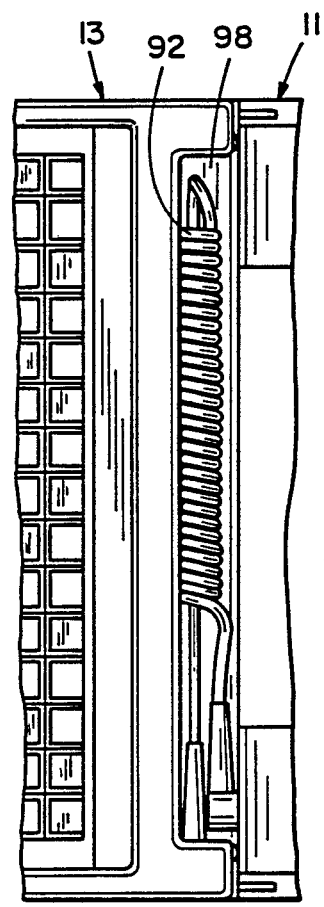
FIG. 10 is a fragmentary top view of the keyboard assembly and base with the keyboard assembly attached.
Figure 11:
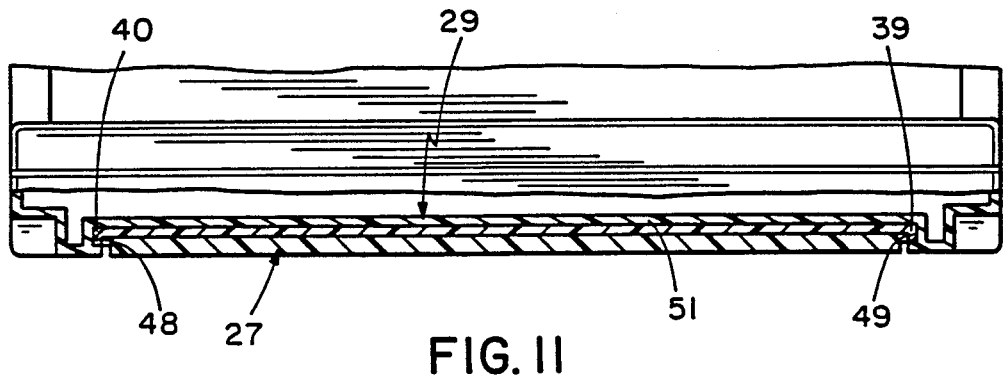
FIG. 11 is a cross-section taken generally along line 11—11 of FIG. 9.

As seen in FIGS. 7 and 9, a pair of pivotal legs 100 and 101 are mounted flush in the bottom wall 50 toward the rear of the keyboard assembly 13 that are designed to be pivoted approximately 90 degrees to bottom wall 50 when the keyboard assembly 13 is detached from the base 11. Legs 100 and 101 thereby provide additional tilt for keyboard assembly 13.

What is claimed is:

1. A portable computer, comprising: a base including at least one drive, a visual display, a keyboard assembly having a longitudinal axis, releasably connected to the base, means to releasably connect the keyboard assembly to the base in an attached position and a stand alone position including interengaging means on the keyboard assembly and base for aligning and holding the keyboard assembly in a predetermined fixed plane with respect to the base, and latch means for releasably locking the keyboard assembly to the base, said interengaging means being separate from the latch means and constructed to align the keyboard assembly prior to the attached position as the keyboard assembly is moved toward the base in a direction perpendicular to the longitudinal axis of the keyboard assembly.

2. A portable computer as defined in claim 1, wherein the latch means includes a releasably engageable spring detent that prevents movement of the keyboard in at least one direction in the plane of the keyboard, a lid assembly pivotally mounted on the computer and movable from a closed position over the keyboard assembly to an open position permitting viewing of the visual display, said interengaging means holding the keyboard assembly in a horizontal plane with respect to the base.

3. A portable computer as defined in claim 1, wherein the interengaging means on the keyboard assembly and the base includes an elongated generally planar projection extending from one and a complementary elongated generally planar excess extending into the other.

4. A portable computer as defined in claim 1, including means for guiding the keyboard assembly toward the base a substantial distance before an attached position.

5. A portable computer as defined in claim 4, wherein the guiding means includes an elongated planar projection with tapered sides on one and a complementary receiving recess on the other.

6. A portable computer as defined in claim 1, wherein the latch means includes a pair of spring biased detents on the keyboard assembly releasably engageable with recesses on the base.

7. A portable computer as defined in claim 6, wherein the detents on the keyboard assembly are upwardly movable to a release position.

8. A portable computer as defined in claim 1, including an elongated recess in the keyboard assembly adjacent the base, a cable electrically interconnecting the keyboard assembly and base having a precoiled section, said recess in the keyboard assembly being sized to receive the cable precoiled section when the keyboard assembly is attached to the base.

9. A portable computer as defined in claim 1, including a retractable leg assembly on the bottom of the keyboard assembly to enable the keyboard to be used in a slightly tilted position.

10. A portable computer, comprising: a base including at least one drive, a visual display, a keyboard assembly having a longitudinal axis, releasably connected to the base, means to releasably connect the keyboard assembly to the base in an attached position and a stand alone position including interengaging means on the keyboard assembly and base for aligning and holding the keyboard assembly in a predetermined angular position with respect to the base, and latch means for releasably locking the keyboard assembly to the base, the interengaging means on the keyboard assembly and the base including an elongated generally planar projection extending from one and a complementary elongated generally planar recess extending into the other that guide the keyboard assembly toward the base in a direction perpendicular to the longitudinal axis of the keyboard assembly a substantial distance before the attached position, said planar projection having converging walls to align the keyboard assembly, said latch means including a pair of spring biased detents on the keyboard assembly releaseably engageable with recesses on the base.

11. A portable computer, comprising: a base including at least one drive, a visual display, a keyboard assembly having a longitudinal axis, releasably connected to the base, means to releasably connect the keyboard assembly to the base in an attached position and a stand alone position, means for guiding the keyboard assembly in a direction perpendicular to the longitudinal axis of the keyboard assembly toward a predetermined locked position on the base, said guiding means being operable significantly in advance of said locked position, and separate latch means for locking the keyboard in said locked position.

12. A portable computer as defined in claim 11, wherein said guiding means also angularly fixes the keyboard in a vertical plane with respect to the base in said locked position.

13. A portable computer as defined in claim 11, wherein the guiding means includes an elongated planar projection with tapered sides on one and a complementary receiving recess on the other.

14. A portable computer as defined in claim 11, wherein the latch means includes a pair of automatically engaging spring biased detents on the keyboard assembly releasably engageable with recesses on the base, said guiding means being constructed to hold the keyboard assembly in a fixed plane.

15. A portable computer as defined in claim 11, including an elongated recess in the keyboard assembly adjacent the base, a cable electrically interconnecting the keyboard assembly and base having a precoiled section, said recess in the keyboard assembly being sized to receive the cable precoiled section when the keyboard assembly is attached to the base.

16. A portable computer, comprising: a base including at least one drive, a keyboard assembly having a longitudinal axis, releasably connected to the base, a lid assembly pivotally mounted on the computer and movable from a closed position over the keyboard assembly to an open position permitting viewing of a visual display, means to releasably connect the keyboard assembly to the base for stand alone use, including means for guiding the keyboard assembly toward a predetermined locked position on the base in a direction perpendicular to the longitudinal axis of the keyboard assembly, said guiding means being operable significantly in advance of the locked position, latch means for locking the keyboard in said locked position, said guiding means including an elongated planar projection with tapered sides on the base and a complementary receiving recess on the keyboard assembly, said latch means including a pair of spring biased detents on the keyboard assembly releasably engageable with recesses in the base, an elongated recess in the keyboard assembly adjacent the base, and a cable electrically interconnecting the keyboard assembly and base having a precoiled section, said elongated recess in the keyboard assembly being sized to receive the cable precoiled section when the keyboard assembly is attached to the base.

17. A portable computer, comprising: a base including at least one drive, a visual display, a keyboard assembly having a longitudinal axis, releasably connected to the base means to releasably connect the keyboard assembly to the base for stand alone use, an elongated recess in an area between and in one of the keyboard assembly and base laying on an axis parallel to the axis of the keyboard assembly, and a flexible cable electrically interconnecting the keyboard assembly and base having a precoiled section having a longitudinal axis, said recess being sized to receive the cable precoiled section when the keyboard assembly is attached to the base, said keyboard assembly and base having connectors for the cable adjacent the recess so that as the keyboard is attached to the base, the cable and its precoiled section move easily and neatly into the recess with the longitudinal axis of the precoiled section lying in the elongated direction of the recess.

18. A portable computer as defined in claim 17, whrein the recess is in the keyboard assembly.

19. A portable computer, comprising: a base including at least one disk drive, a visual display, a keyboard assembly having a longitudinal axis, releasably connected to the base, means to releasably connect the keyboard assembly to the base so that the keyboard can move from an attached position to a stand alone position including interengaging guide means on the base and keyboard assembly for guiding the keyboard assembly toward the attached position and for holding the keyboard assembly in a fixed plane with respect to the base, and separate latch means for preventing movement of the keyboard assembly in said fixed plane, whereby the latch means and guide means cooperate in locking the keyboard assembly to the base.

20. A portable computer, as defined in claim 19, wherein the guide means hold the keyboard assembly in a fixed horizontal plane.

* * * * *